(12) United States Patent
Thayer et al.

(10) Patent No.: US 9,521,138 B2
(45) Date of Patent: *Dec. 13, 2016

(54) SYSTEM FOR DOMAIN CONTROL VALIDATION

(71) Applicant: Go Daddy Operating Company, LLC, Scottsdale, AZ (US)

(72) Inventors: Wayne Thayer, Phoenix, AZ (US); Jacob Plains, Phoenix, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 581 days.

This patent is subject to a terminal disclaimer.

(21) Appl. No.: 13/918,716

(22) Filed: Jun. 14, 2013

(65) Prior Publication Data
US 2014/0373097 A1 Dec. 18, 2014

(51) Int. Cl.
*H04L 29/06* (2006.01)
(52) U.S. Cl.
CPC .................. *H04L 63/0823* (2013.01)
(58) Field of Classification Search
CPC .... H04L 63/10; H04L 63/0823; H04L 63/308; H04L 9/321; H04L 9/3263
USPC ......................................................... 726/4
See application file for complete search history.

(56) References Cited

U.S. PATENT DOCUMENTS

| | | |
|---|---|---|
| 5,075,787 A | 12/1991 | Shaughnessy et al. |
| 5,247,497 A | 9/1993 | Cohn |
| 5,657,390 A | 8/1997 | Elgamal et al. |
| 5,825,890 A | 10/1998 | Elgamal et al. |
| 5,892,904 A | 4/1999 | Atkinson et al. |
| 5,903,882 A | 5/1999 | Asay et al. |
| 6,233,577 B1 | 5/2001 | Ramasubramani et al. |
| 6,308,277 B1 | 10/2001 | Vaeth |
| 6,311,207 B1 | 10/2001 | Mighdoll et al. |
| 6,321,339 B1 | 11/2001 | French et al. |
| 6,370,249 B1 | 4/2002 | Van Oorschot |
| 6,430,688 B1 | 8/2002 | Kohl et al. |
| 6,591,265 B1 | 7/2003 | Erickson et al. |
| 6,751,600 B1 | 6/2004 | Wolin |

(Continued)

FOREIGN PATENT DOCUMENTS

WO 03049358 6/2003

OTHER PUBLICATIONS

Internet print-out of http://web.archive.org/web/20000901042248/http://www.datex.net/ecommerce/glossary.htm, Internet archive of datex.net, Sep. 1, 2000.

(Continued)

*Primary Examiner* — Tu Nguyen
(74) *Attorney, Agent, or Firm* — Quarles & Brady LLP

(57) ABSTRACT

A system and method for domain control validation is presented. At a certificate authority a request is received. The request includes a certificate signing request and a first Internet protocol address. The certificate signing request identifies a domain and a certificate. A second Internet protocol address for the domain is retrieved from a domain name system. When the first Internet protocol address is the same as the second Internet protocol address, the certificate is signed, and the signed certificate is transmitted to a requester of the request. When the first Internet protocol address is not the same as the second Internet protocol address, the certificate signing request is rejected.

10 Claims, 4 Drawing Sheets

(56) References Cited

U.S. PATENT DOCUMENTS

| | | |
|---|---|---|
| 6,785,810 B1 | 8/2004 | Lirov et al. |
| 6,792,531 B2 | 9/2004 | Heiden et al. |
| 6,856,963 B1 | 2/2005 | Hurwitz |
| 6,928,167 B1 | 8/2005 | Maeda et al. |
| 6,950,933 B1 | 9/2005 | Cook et al. |
| 6,968,571 B2 | 11/2005 | Devine et al. |
| 6,981,139 B2 | 12/2005 | Enokida |
| 6,986,049 B2 | 1/2006 | Delany |
| 7,003,661 B2 | 2/2006 | Beattie et al. |
| 7,073,057 B2 | 7/2006 | Moses et al. |
| 7,111,162 B1 | 9/2006 | Bagepalli et al. |
| 7,114,177 B2 | 9/2006 | Rosenberg et al. |
| 7,120,929 B2 | 10/2006 | Beattie et al. |
| 7,149,892 B2 | 12/2006 | Freed et al. |
| 7,152,104 B2 | 12/2006 | Musante et al. |
| 7,155,723 B2 | 12/2006 | Swildens et al. |
| 7,233,978 B2 | 6/2007 | Overton et al. |
| 7,289,971 B1 | 10/2007 | O'Neil et al. |
| 7,373,500 B2 | 5/2008 | Ramelson et al. |
| 7,433,710 B2 | 10/2008 | Bodnar et al. |
| 7,437,558 B2 | 10/2008 | Fenton et al. |
| 7,467,206 B2 | 12/2008 | Moore et al. |
| 7,516,418 B2 | 4/2009 | Herley et al. |
| 7,526,649 B2 | 4/2009 | Wiseman et al. |
| 7,552,466 B2 | 6/2009 | Rosenberg |
| 7,562,212 B2 | 7/2009 | Beattie et al. |
| 7,599,847 B2 | 10/2009 | Block et al. |
| 7,627,896 B2 | 12/2009 | Herrmann |
| 7,647,494 B2 | 1/2010 | Wray et al. |
| 7,649,854 B2 | 1/2010 | Piper |
| 7,653,577 B2 | 1/2010 | Warner |
| 7,673,331 B2 | 3/2010 | Kido et al. |
| 7,702,902 B2 | 4/2010 | Thayer et al. |
| 7,707,404 B2 | 4/2010 | Thayer et al. |
| 7,757,074 B2 | 7/2010 | Sundarrajan et al. |
| 7,788,495 B2 | 8/2010 | Anthe, II et al. |
| 7,804,982 B2 | 9/2010 | Howard et al. |
| 7,814,141 B2 | 10/2010 | Parsons et al. |
| 7,860,755 B2 | 12/2010 | Warner |
| 7,870,213 B2 | 1/2011 | Parsons et al. |
| 7,870,214 B2 | 1/2011 | Parsons et al. |
| 7,899,187 B2 | 3/2011 | Messerges et al. |
| 7,912,906 B2 | 3/2011 | Thayer |
| 7,970,858 B2 | 6/2011 | Adelman et al. |
| 7,996,512 B2 | 8/2011 | Adelman et al. |
| 8,024,578 B2 | 9/2011 | Geosimonian |
| 8,046,578 B1 | 10/2011 | Trudeau et al. |
| 8,086,848 B2 | 12/2011 | Thayer et al. |
| 8,103,761 B2 | 1/2012 | Adelman et al. |
| 8,112,310 B1 | 2/2012 | Yehoshua et al. |
| 8,117,439 B2 | 2/2012 | Rodriguez |
| 8,145,707 B2 | 3/2012 | Thayer et al. |
| 8,156,190 B2 | 4/2012 | Thayer et al. |
| 8,185,741 B1 | 5/2012 | Agrawal et al. |
| 8,275,671 B2 | 9/2012 | Warner |
| 8,285,816 B2 | 10/2012 | Adelman et al. |
| 8,352,742 B2 | 1/2013 | Thayer et al. |
| 8,355,528 B2 | 1/2013 | Bladel et al. |
| 8,364,771 B2 | 1/2013 | Thayer et al. |
| 8,370,407 B1 | 2/2013 | Devarajan et al. |
| 8,370,444 B2 | 2/2013 | Thayer et al. |
| 8,370,940 B2 | 2/2013 | Holloway et al. |
| 2001/0011255 A1 | 8/2001 | Asay et al. |
| 2001/0049786 A1 | 12/2001 | Harrison et al. |
| 2002/0031230 A1 | 3/2002 | Sweet et al. |
| 2002/0059144 A1 | 5/2002 | Meffert et al. |
| 2002/0069129 A1 | 6/2002 | Akutsu et al. |
| 2002/0133365 A1 | 9/2002 | Grey et al. |
| 2002/0138725 A1 | 9/2002 | Moses et al. |
| 2002/0169842 A1 | 11/2002 | Christensen et al. |
| 2002/0184493 A1 | 12/2002 | Rees |
| 2002/0198824 A1 | 12/2002 | Cook |
| 2002/0198866 A1 | 12/2002 | Kraft et al. |
| 2002/0199119 A1 | 12/2002 | Dunnion et al. |
| 2003/0005287 A1 | 1/2003 | Wray et al. |
| 2003/0023878 A1 | 1/2003 | Rosenberg et al. |
| 2003/0028762 A1 | 2/2003 | Trilli et al. |
| 2003/0037261 A1 | 2/2003 | Meffert et al. |
| 2003/0065921 A1 | 4/2003 | Chang |
| 2003/0115475 A1 | 6/2003 | Russo et al. |
| 2003/0120649 A1 | 6/2003 | Uchino et al. |
| 2003/0126431 A1 | 7/2003 | Beattie et al. |
| 2003/0154371 A1 | 8/2003 | Filipi-Martin et al. |
| 2003/0172059 A1 | 9/2003 | Andrei |
| 2003/0182573 A1 | 9/2003 | Toneguzzo et al. |
| 2003/0217165 A1 | 11/2003 | Buch et al. |
| 2004/0030887 A1 | 2/2004 | Harrisville-Wolff et al. |
| 2004/0049675 A1 | 3/2004 | Micali et al. |
| 2004/0068650 A1 | 4/2004 | Resnitzky et al. |
| 2004/0122926 A1 | 6/2004 | Moore et al. |
| 2004/0138975 A1 | 7/2004 | Engel et al. |
| 2004/0148505 A1 | 7/2004 | Qiu |
| 2004/0172340 A1 | 9/2004 | Bishop et al. |
| 2004/0177120 A1 | 9/2004 | Kirsch |
| 2004/0181665 A1 | 9/2004 | Houser |
| 2004/0210663 A1 | 10/2004 | Phillips et al. |
| 2004/0250075 A1 | 12/2004 | Anthe et al. |
| 2005/0015586 A1 | 1/2005 | Brickell et al. |
| 2005/0069136 A1 | 3/2005 | Thornton et al. |
| 2005/0071630 A1 | 3/2005 | Thornton et al. |
| 2005/0076199 A1 | 4/2005 | Thornton et al. |
| 2005/0080899 A1 | 4/2005 | Vogel et al. |
| 2005/0081026 A1 | 4/2005 | Thornton et al. |
| 2005/0085931 A1 | 4/2005 | Willeby |
| 2005/0086175 A1 | 4/2005 | Brique et al. |
| 2005/0114652 A1 | 5/2005 | Swedor et al. |
| 2005/0125319 A1 | 6/2005 | Johnson |
| 2005/0132221 A1 | 6/2005 | Marcjan |
| 2005/0166262 A1 | 7/2005 | Beattie et al. |
| 2005/0172128 A1 | 8/2005 | Little et al. |
| 2005/0228881 A1 | 10/2005 | Reasor et al. |
| 2005/0228998 A1 | 10/2005 | Chan et al. |
| 2005/0246534 A1 | 11/2005 | Kirkup et al. |
| 2005/0246771 A1 | 11/2005 | Hunt et al. |
| 2005/0257261 A1 | 11/2005 | Shraim et al. |
| 2005/0273781 A1 | 12/2005 | Nakamura et al. |
| 2005/0283837 A1 | 12/2005 | Olivier et al. |
| 2006/0005009 A1 | 1/2006 | Ball et al. |
| 2006/0009994 A1 | 1/2006 | Hogg et al. |
| 2006/0015472 A1 | 1/2006 | Ahlander et al. |
| 2006/0015716 A1 | 1/2006 | Thornton et al. |
| 2006/0015722 A1 | 1/2006 | Rowan et al. |
| 2006/0015729 A1 | 1/2006 | Novack et al. |
| 2006/0015942 A1 | 1/2006 | Judge et al. |
| 2006/0015943 A1 | 1/2006 | Mahieu |
| 2006/0031314 A1 | 2/2006 | Brahms et al. |
| 2006/0031492 A1 | 2/2006 | Thayer et al. |
| 2006/0041761 A1 | 2/2006 | Neumann et al. |
| 2006/0047950 A1 | 3/2006 | Thayer |
| 2006/0047951 A1 | 3/2006 | Reilly et al. |
| 2006/0047965 A1 | 3/2006 | Thayer et al. |
| 2006/0069697 A1 | 3/2006 | Shraim et al. |
| 2006/0095404 A1 | 5/2006 | Adelman et al. |
| 2006/0095586 A1 | 5/2006 | Adelman et al. |
| 2006/0143442 A1 | 6/2006 | Smith |
| 2006/0161644 A1 | 7/2006 | Adelman et al. |
| 2006/0168116 A1 | 7/2006 | Adelman et al. |
| 2006/0174334 A1 | 8/2006 | Perlin et al. |
| 2006/0200487 A1 | 9/2006 | Adelman et al. |
| 2006/0206890 A1 | 9/2006 | Shenfield et al. |
| 2006/0212925 A1 | 9/2006 | Shull et al. |
| 2006/0212930 A1 | 9/2006 | Shull et al. |
| 2006/0253458 A1 | 11/2006 | Dixon et al. |
| 2006/0253583 A1 | 11/2006 | Dixon |
| 2006/0253584 A1 | 11/2006 | Dixon et al. |
| 2006/0282335 A1 | 12/2006 | Hanks et al. |
| 2007/0005564 A1 | 1/2007 | Zehner |
| 2007/0006321 A1 | 1/2007 | Bantz et al. |
| 2007/0022162 A1 | 1/2007 | Thayer et al. |
| 2007/0022292 A1 | 1/2007 | Thayer et al. |
| 2007/0022477 A1 | 1/2007 | Larson |
| 2007/0067465 A1 | 3/2007 | Blinn et al. |
| 2007/0101400 A1 | 5/2007 | Freeman et al. |
| 2007/0174630 A1 | 7/2007 | Shannon et al. |

(56) References Cited

U.S. PATENT DOCUMENTS

| | | |
|---|---|---|
| 2007/0174635 A1 | 7/2007 | Jones |
| 2007/0208940 A1 | 9/2007 | Adelman et al. |
| 2007/0244974 A1 | 10/2007 | Chasin |
| 2008/0021890 A1 | 1/2008 | Adelman et al. |
| 2008/0022013 A1 | 1/2008 | Adelman et al. |
| 2008/0028100 A1 | 1/2008 | Adelman et al. |
| 2008/0028443 A1 | 1/2008 | Adelman et al. |
| 2008/0059348 A1 | 3/2008 | Glassman et al. |
| 2008/0077517 A1 | 3/2008 | Sappington |
| 2008/0143548 A1 | 6/2008 | Grimmelmann et al. |
| 2008/0182561 A1 | 7/2008 | Kim et al. |
| 2008/0183551 A1 | 7/2008 | Jain |
| 2008/0201575 A1* | 8/2008 | van der Rijn ........... H04L 9/321 713/156 |
| 2008/0209208 A1 | 8/2008 | Parkinson |
| 2008/0235806 A1 | 9/2008 | Bantz et al. |
| 2008/0270209 A1 | 10/2008 | Mauseth et al. |
| 2008/0271143 A1 | 10/2008 | Stephens et al. |
| 2008/0282338 A1 | 11/2008 | Beer |
| 2008/0287094 A1 | 11/2008 | Keeler et al. |
| 2008/0307339 A1 | 12/2008 | Boro et al. |
| 2008/0320591 A1 | 12/2008 | Fenton et al. |
| 2009/0007229 A1 | 1/2009 | Stokes |
| 2009/0100263 A1 | 4/2009 | Leonard |
| 2009/0164598 A1 | 6/2009 | Nelson et al. |
| 2009/0210444 A1 | 8/2009 | Bailey et al. |
| 2009/0248595 A1 | 10/2009 | Lu et al. |
| 2010/0037314 A1 | 2/2010 | Perdisci et al. |
| 2010/0111300 A1 | 5/2010 | Kido et al. |
| 2010/0281539 A1 | 11/2010 | Burns et al. |
| 2010/0293371 A1 | 11/2010 | Thayer et al. |
| 2011/0055248 A1 | 3/2011 | Consuegra et al. |
| 2011/0055923 A1 | 3/2011 | Thomas |
| 2011/0173149 A1 | 7/2011 | Schon |
| 2011/0179275 A1 | 7/2011 | Thayer et al. |
| 2011/0179362 A1 | 7/2011 | Craddock et al. |
| 2011/0185172 A1 | 7/2011 | Thayer et al. |
| 2011/0307696 A1 | 12/2011 | Masuda |
| 2012/0023090 A1 | 1/2012 | Holloway et al. |
| 2012/0066763 A1 | 3/2012 | McHugh et al. |
| 2012/0114191 A1 | 5/2012 | Bladel et al. |
| 2012/0116896 A1 | 5/2012 | Holloway et al. |
| 2012/0117641 A1 | 5/2012 | Holloway et al. |
| 2012/0174196 A1 | 7/2012 | Bhogavilli et al. |
| 2013/0066673 A1 | 3/2013 | Rose et al. |
| 2013/0111609 A1 | 5/2013 | Resch et al. |
| 2014/0108802 A1 | 4/2014 | Clevy et al. |
| 2014/0136655 A1 | 5/2014 | Oshima |

OTHER PUBLICATIONS

Meyers, X.509 Internet Public Key Infrastructure, Online Certificate Status Protocol—OCSP, RFC 2560, Jun. 1999, http://www.ietf.org/rfc/rfc2560.txt.
PKCS #10: Certification Request Syntax Specification. RFC 2986, Nov. 2000, http://www.ietf.org/rfc/rfc2986.txt.
Pew Internet Project Data Memo. http://www.pewinternet.org/pdfs/PIP_Datamemo_Reputation.pdf.
Secure In-band Update of Trusted Certificates, IEEE 1999, 8th International Workshops on Jun. 16-18, 1999; pp. 168-173.
Certificate Validation Service using XKMS for Computational Grid, Proceedings of the 2003 ACM workshop on XML security; pp. 112-120.
Sun Microsystems, Inc., iPlanet Certificate Management System 4.2-SP2 Installation and Setup Guide, Chapter 17 Scheduling Automated Jobs, Apr. 2, 2001.
Sun Microsystems, Inc., iPlanet Certificate Management System 4.2-SP2 Installation and Setup Guide, Chapter 24 Issuing and Managing Server Certificates, Apr. 2, 2001.
Sun Microsystems, Inc., iPlanet Certificate Management System Installation and Setup Guide. Chapter 1 Introduction to Certificate Management System, Apr. 2, 2001.
Valicert Ships Third Generation Validation Authority Solution, Oct. 18, 1999.
SSL Certificate Validation Procedures (Webpage print-out from Xramp.com), Jul. 22, 2006.
Technical Information—Root Expiry. Entrust.Net. 2000. http://www.auznic.net/digcerts/rootexpiry.pdf.
Reputation-Based Mail Flow Control. IronPort Systems, Inc. http://www.ironport.com/pdf/ironport_c60_rep_based_paper.pdf, 2002.
Fratto, Certificate Revocation: When Not to Trust. Network Computing. Jun. 26, 2000. http://www.networkcomputing.com/1112/1112ws1.html.
Reputation Network Analysis for Email Filtering. http://www.ceas.cc/papers-2004/177.pdf, 2004.
Communigatepro, WebUser Interface: Secure Mail (S/MIME), unknown date.
Maximilien et al., "Conceptual Model of Web Service Reputation", 2002.
Josang et al., "The Beta Reputation System", 2002.
How to Obtain Your Own SSL Certificate; pp. 1-6. http://web.archive.org/web/200301 07071637/http://www.teamits.com/interneUsupporUdigital-id.html, 2003.
Dictionary.com, "Register," in Dictionary.com Unabridged. Source location: Random House, Inc., Jul. 16, 2010.
Dictionary.com, "Reputation," in Dictionary.com Unabridged. Source location: Random House, Inc., Jul. 16, 2010.
Dictionary.com, "Satisfactory," in Dictionary.com Unabridged. Source location: Random House, Inc., Jul. 16, 2010.
Dictionary.com, "Subscribe," in Dictionary.com Unabridged. Source location: Random House, Inc., Jul. 16, 2010.
Ramaswamy Chandramouli and Scott Rose "Challenges in Securing the Domain Name System", IEEE Security & Privacy, 2006, pp. 84-87.
Internet printed out https:/lwww.usps.com/postalinspectors/fraud/MailFraudComplaint.htm, Mail Fraud Complaint Form, Aug. 2003.
Title "VhostTaskForce" found on the Internet @ http://wiki.cacert.org/wiki/VhostTaskForce.
Register.com to Issue Baltimore Digital Certificates Making e-Security Accessible to All e-Businesses, Nov. 20, 2008, Register.com, pp. 1.
PCT Application Publication WO 02/101620 A1 to In, Hyoung-Woo, International Publication Date Dec. 19, 2002.
Farmer, Felanie Austria; "VeriSign buys Network Solutions in $21 billion dear"; Mar. 7, 2000; CNET News.
"NIST/SEMATECH e-Handbook of Statistical Methods, § 7.2.5.2 Percentiles,http://www.itl.nist.gov/div898/handbook/prc/section2/prc252.htm (2003)".
O Hasan, L Brunie, JM Pierson, & E Bertino. Elimination of Subjectivity from Trust Recommendation. The 3rd IFIP International Conference on Trust Management (TM 2009), West Lafay, IN Jun. 15-19, 2009.
What is "domain control validation"?; CoolHandle Hosting; https://support.coolhandle.com/index.php?_m=knowledgebase&_a=viewarticle&kbarticleid=1769; Retrieved Jun. 23, 2015; Last updated Jan. 26, 2010.
The Inconvenient Truth About Web Certificates; Nevena Vratonjic et al.; Economics of Information Security and Privacy III; pp. 79-117; Jul. 27, 2012.

* cited by examiner

SYSTEM FOR DOMAIN CONTROL VALIDATION

FIELD OF THE INVENTION

The present invention relates to a system for validating control of a domain.

BACKGROUND OF THE INVENTION

The Internet comprises a vast number of computers and computer networks that are interconnected through communication links. The interconnected computers exchange information using various services, such as electronic mail, Gopher, and the World Wide Web (WWW). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator (URL). To view a specific Web page, a client computer system specifies the URL for the Web page in a request (e.g., a HyperText Transfer Protocol (HTTP) request). These follow the familiar format http://www.example.com uniquely identifying the particular resource. The request is forwarded to the Web server that supports that Web page to the client computer system. When the client computer system receives that Web page, it typically displays the Web page using a browser. A browser is a special-purpose application program that effects the requesting of Web pages and the displaying of Web pages.

The domain name system (DNS) is the world's largest distributed computing system that enables access to any resource in the Internet by translating user-friendly domain names to IP Addresses. The process of translating domain names to IP Addresses is called Name Resolution. A DNS name resolution is the first step in the majority of Internet transactions. The DNS is in fact a client-server system that provides this name resolution service through a family of servers called Domain Name Servers. The hierarchical domain space is divided into administrative units called zones. A zone usually consists of a domain (e.g., example.com) and possibly one or more sub domains (e.g., projects.example.com, services.example.com). The authoritative data needed for performing the name resolution service is contained in a file called the zone file and the DNS servers hosting this file are called the authoritative name servers for that zone. The DNS clients that make use of the services provided by authoritative name servers may be of two types. One type is called a stub resolver that formulates and sends a query every time it receives a request from an application that requires Internet service (e.g., a browser). The other type is called a caching (also called recursive/resolving) name server that caches the name resolution responses it has obtained from authoritative name servers and thus able to serve multiple stub resolvers.

Generally a web page's address or URL is made up of the name of the server along with the path to the file or the server. Rather than using a web hosting service's server name as their URL, most companies and many individuals and other entities prefer a "domain name" of their own choosing. In other words, the Ford Motor Company probably would prefer http://www.ford.com as its URL rather than, say, http://servername.com/.about.ford, where "servername" is the name of a Web hosting service whose server The Ford Motor Company uses. For this purpose then a "domain name," e.g. "ford" can be registered, if available, and the hosting service will use that URL for its customer's web address.

As is well known, the Internet is used every day to execute a large number of transactions, many of which can be of a sensitive or confidential nature. Monetary transactions, for example, often involve the communication of sensitive financial data that should not be divulged to third parties. Other transactions may involve trade secrets, personal information, and the like, that should not be publicly available. When sensitive information is communicated via the Internet, in certain circumstances, it is sometimes possible for malicious third parties to access that information. Two common schemes for accessing such information involve 1) the malicious user creating a web site that imitates the identity of another, trusted, entity, and 2) a man-in-the-middle attack, where the malicious user intercepts the sensitive communication.

The first type of fraud involves the malicious operator of a web site hiding or obscuring their identity from their customers. Essentially, the operator of a web site takes advantage of the anonymity provided by the Internet, thereby making it difficult for customers to locate and punish a fraudulent web site operator. For example, a web site may purport to be from a known and trusted business when the web site is in fact operated by an unscrupulous individual. The malicious user may try to receive credit card numbers or pass off goods and services under another's trademark as part of their fraudulent scheme.

To increase the perceived validity of the malicious user's false web site, the malicious user may have inserted false information in the WHOIS database when registering their false domain name in order to hide their identity.

The second type of fraud involves malicious individuals intercepting confidential information, such as credit card numbers, transmitted over the Internet between a customer and a legitimate web site. This type of fraud is less common and can be prevented by transmitting confidential information only in a sufficiently strong encrypted format.

A common method for Internet businesses to protect their customers from these two types of fraud is to obtain a secure certificate, such as a Secure Sockets Layer (SSL) certificate, for their web sites. A secure certificate, once installed on a web site, lets customers know that the owner of the web site (that is, the holder of the certificate) has been verified by a trusted third party (e.g., a certificate authority or CA) and that confidential communications with the web site are or, at least, can be encrypted. SSL is a protocol for transmitting private documents via the Internet. SSL protects confidential information by using a private key to encrypt data transferred over an SSL connection. Many, many applications support the SSL protocol, and many web sites use the protocol to communicate confidential information with their customers.

When connecting to a web site using the SSL protocol, the customer's browser accesses the web site's security certificate and retrieves information regarding the certificate authority that issued the web site's security certificate. The browser may then decide whether or not to trust the web site's security certificate based on which certificate authority issued the web site's security certificate, as well as other information contained within the security certificate.

Before a formal SSL certificate can be issued, a certificate authority is required to sign off on the identity of the holder of the certificate. As such, the certificate authority is required to confirm that the individual or business listed in the subject field of the certificate actually exists and is accurately described within the certificate.

DETAILED DESCRIPTION

Figure 1:
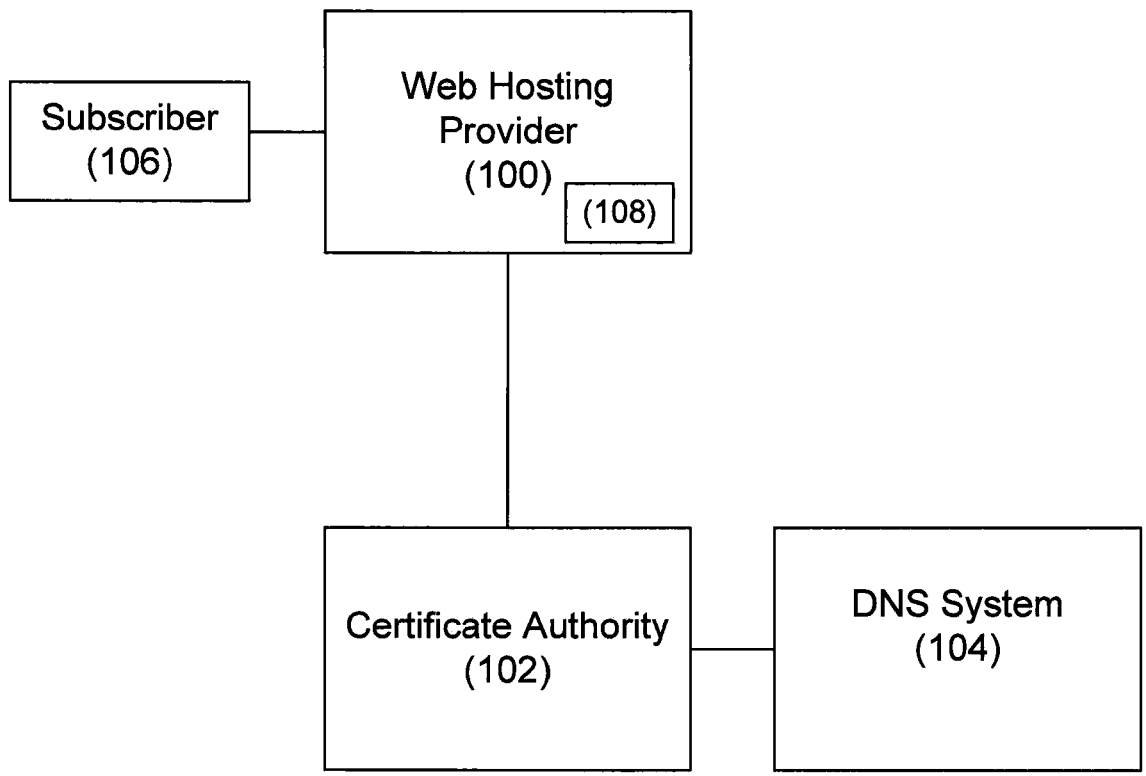
FIG. 1 is a block diagram showing an example environment in which the present system and method may be implemented.

The present disclosure provides a system and method for verifying control of a domain. The system and method may be used, for example, as part of the domain control validation process utilized in conjunction with the issuance of security certificates.

In one implementation, the present disclosure provides a method including receiving, at a certificate authority, a request including a certificate signing request and a first Internet protocol address. The certificate signing request identifies a domain and a certificate. The method includes retrieving a second Internet protocol address for the domain from a domain name system, and when the first Internet protocol address is the same as the second Internet protocol address, signing the certificate, and transmitting the signed certificate to a requester of the request. When the first Internet protocol address is not the same as the second Internet protocol address, the method includes rejecting the certificate signing request.

In another implementation, the present disclosure provides a method including providing an administrative interface for a hosted account. The hosted account is associated with a domain and a hosted website for the domain. The method includes receiving, via the administrative interface, a request for a security certificate for the hosted website, and generating a certificate signing request for the hosted website. The certificate signing request identifies the domain. The method includes determining an Internet protocol address for the hosted website of the domain, transmitting the certificate signing request and the Internet protocol address to a certificate authority, and receiving a response to the certificate signing request from the certificate authority.

In another implementation, the present disclosure provides a system including at least one server computer having a processor and being configured to receive a request including a certificate signing request and a first Internet protocol address. The certificate signing request identifies a domain and a certificate. The at least one server computer is configured to retrieve a second Internet protocol address for the domain from a domain name system, and when the first Internet protocol address is the same as the second Internet protocol address, sign the certificate, and transmit the signed certificate to a requester of the request. When the first Internet protocol address is not the same as the second Internet protocol address, the at least one server computer is configured to reject the certificate signing request.

In another implementation, the present disclosure provides a system including at least one server computer having a processor and being configured to provide an administrative interface for a hosted account. The hosted account is associated with a domain and a hosted website for the domain. The at least one server computer is configured to receive, via the administrative interface, a request for a security certificate for the hosted website, and generate a certificate signing request for the hosted website. The certificate signing request identifies the domain. The at least one server computer is configured to determine an Internet protocol address for the hosted website of the domain, transmit the certificate signing request and the Internet protocol address to a certificate authority, and receive a response to the certificate signing request from the certificate authority.

FIG. 1 is a block diagram showing an example environment in which the present system and method may be implemented. Web hosting provider 100 is configured to host one or more websites 108 for the domains of a number of subscribers, such as subscriber 106. Hosting provider 100 implements the hardware and software necessary to make the websites of subscribers of the services offered by hosting provider 100 available to users on the Internet.

In addition to providing website hosting services, web hosting provider 100 can provide administration services allowing subscriber 106 to modify one or more settings associated with the subscriber's website 108, modify the content thereof, and request additional of fewer services associated with the subscriber's website 108. Often these administration services are provided through web-based applications provided by the web hosting provider 100 and hosted by the servers of web hosting provider 100. To utilize the applications, the subscriber 106 must first login to an appropriate administration interface using a password or other authentication token or combination of tokens. Once authenticated, the subscriber 106 can utilize the administration interface to modify settings associated with the subscriber's domain, including modifying the hosted website content, changes services associated with the domain, and the like. Generally, the login credentials of the subscriber 106 are associated with a particular website 108, or collections of websites 108.

For example, to enable communications through the website of subscriber 106 to be secured, subscriber 106 may utilize an administration interface supplied by the web hosting provider 100 to request secure communication services (e.g., SSL services) for the web site 108. In one case, this request may be submitted through an appropriate web-based interface provided by hosting provider 100 using a computer accessible to subscriber 106 (e.g., the subscriber's computer).

In order to provide secure communication services, a security certificate is generated for the website of subscriber 106. The certificate may include a key pair, including a private key (maintained in secrecy) and a public key (made publicly available on the website of subscriber 106). With reference to FIG. 1, therefore, the subscriber 106, the web hosting provider 100, or another entity associated with the website of subscriber 106 may generate the key pair. The public and private keys, as is known in the art, can be utilized to encrypt communications between a customer (and other users) and the website of subscriber 100 and form part of the security certificate.

Before a security certificate can be utilized to authoritatively identify a particular entity (e.g., the entity that is affiliated with a particular website), the certificate should be signed by a certificate authority, such as certificate authority 102. In order to generate a signed security certificate for a particular website, therefore, a certificate signing request (CSR) is generated and transmitted to certificate authority 18. The CSR includes a copy of the subscriber's certificate, as well as additional information identifying the subscriber (or entity requesting that the certificate be signed) and the domain for which the certificate will be issued. The CSR represents a formal request that certificate authority 102 certify the identity of the purported certificate holder and, if that identity is certified, sign the public key included in the CSR. The CSR includes information describing the key pair as well as information describing the entity to whom the security certificate will be issued (i.e., the requester) as well as the domain being secured. Table 2, below, shows example contents of a CSR.

TABLE 1

| Field | Description |
| --- | --- |
| Distinguished Name (DN) | The domain name being secured |
| Subject | The entity (either business or individual) associated with the certificate |
| Departmental Name/ Organizational Unit | A department of the Subject that may be associated with the certificate |
| Town/City | Location of the Subject |
| Province, Region, County, or State | Location of the Subject |
| Country | Country of the Subject |
| Email Address | Email address for the Subject |

Upon receipt of the CSR, certificate authority 102 attempts to verify the identity of the requester by, for example, asking for copies of identification documents or by asking for information not publicly available regarding the requester. If the identity of the requester was successfully verified, the certificate authority 102 creates and signs the certificate, which is then transmitted to subscriber 106 or hosting provider 108. The signed security certificate can then be installed on subscriber 106's web site 14.

Once the signed certificate is installed on website 108, a third party, such as a customer of subscriber 106 desiring to purchase goods and services from subscriber 106, may use a browser to access the subscriber's SSL-compliant web site 108. The browser will request from the web site 108 the web site's signed SSL certificate, which includes the identity of the certificate authority that issued the certificate. Browsers that support the SSL protocol have a list of trusted certificate authorities and the browser will compare the certificate authority that issued the certificate to the list of trusted certificate authorities. This procedure allows the customer's browser to both inspect and verify the identity of the holder of the certificate and ensure that the holder's identity has been validated by a trusted source.

In some implementations, certificate authority 102 and web hosting provider 100 can have a trusted relationship. That is, web hosting provider 100 may have demonstrated to certificate authority 102 that it can be trusted to provide none-fraudulent information to certificate authority 102 with a CSR or in conjunction with the transmission of the same. In some cases, this trust relationship can be developed by certificate authority 102 performing an investigation into web hosting provider 100 (e.g., checking business credentials, interviewing business leaders and/or owners, investing business history, investigating in place security procedures and mechanisms, reviewing hiring practices, and the like). Alternatively, the trusted relationship may be established because both web hosting provider 100 and certificate authority 102 are, in fact, the same entity or managed by the same entity. In some cases, certificate authority 102 may also trust requests issued by a web hosting provider regardless of whether a pre-existing trusted relationship exists.

In some cases the trusted relationship enables the certificate authority to delegate some of its responsibilities to the web hosting provider, which can operate as an affiliate of the certificate authority. In such a case, the processes employed by the certificate authority in delegating such responsibility may be required to satisfy various process and/or qualification requirements as set out by a body responsible for governing the issuance of SSL certificates. For example, the certificate authority may additionally undertake to verify that the delegated-to web hosting provider's personnel involved in the issuance of a certificate meet certain training and skills requirements.

In establishing the trusted relationship, certain expectations can be set for the operations of the web hosting provider. For example, the terms of the relationship may require that the web hosting provider prevent the creation of multiple web hosting accounts that all claim to be associated with the same domain (e.g., multiple users cannot each create accounts for the domain 'bank.com' with the same web hosting provider). If this restriction were not in place, the multiple accounts could each potentially be hosted on the same server having the same IP address. In that case, both non-fraudulent and fraudulent accounts could share the same IP address.

Another restriction that may be put into place as part of the trusted relationship may that the web hosting provider exercise full control of the servers the provider uses to host content. This restriction ensures that multiple, different, web hosting providers cannot each host web sites that are stored on the same server (and therefore have the same IP address). This would prevent two different accounts that are each associated with different web hosting providers from being associated with the same IP address (should the two web hosting providers utilize the same server to host content). If that condition were permissible, a fraudulent account (mimicking a non-fraudulent account with a first hosting provider) could be created on a second hosting provider, where both the first and second hosting providers use the same server (and therefore IP address) to host content. In such a case, both the fraudulent and non-fraudulent accounts would be associated with the same IP address.

Referring to FIG. 1, the depicted environment includes DNS system 104. DNS system 104 communicates via en electronic network (e.g., the Internet) to perform Name Resolution activities.

Because a security certificate, once signed by a certificate authority, is trusted by the general public, it is important that the entity identified in the CSR be verified as the entity in control of the domain. Without such a validation, it may be possible for individuals to request signed certificate for domains that belong to other entities. For example, an individual having nothing to do with the organization may request a signed certificate for a bank's domain (e.g., bankofamerica.com). If the certificate authority should fail to detect that the individual issuing the CSR is not in control of that domain and should sign the certificate in the CSR, that individual may then be able to use that signed certificate to fool others into believing that they are communicating with bankofamerica.com.

A number of techniques exist for validating that entities submitting CSRs are the controlling entities for the domains identified in the CSR. In some cases, upon receiving a CSR, the certificate authority will access WHOIS records for the identified domain to identify the administrative contact for the domain. The certificate authority can then communicate with the identified administrative contact (or any other contact listed in the WHOIS records) to verify that the CSR is valid and requested by the administrative contact, or another appropriate entity. Alternatively, the certificate authority can demand that the requester modify the DNS records associated with the domain in order to demonstrate that the requester has sufficient control over the domain to properly issue the CSR. Another technique involves demanding that the requester modify content hosted at the domain identified in the CSR. If the requester is able to modify the hosted content (e.g., by inserting a hidden code into the web page) that modification demonstrates that the requester has sufficient control to properly issue the CSR.

These existing techniques all require that the requester of the CSR take some specific action to demonstrate to the certificate authority sufficient control for the certificate authority to sign the certificate.

In the present system and method, a certificate authority can validate that the requester of a CSR has control over the identified domain without requiring additional actions from the requester, in contrast to existing validation mechanisms.

Figure 2:
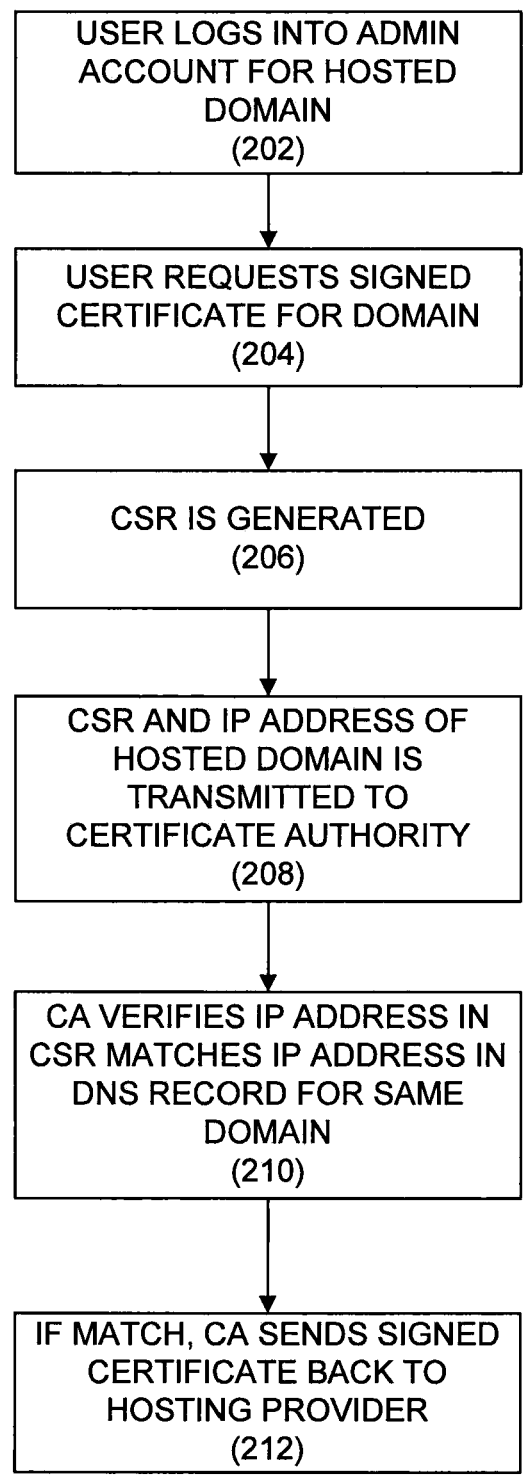
FIG. 2 is a flowchart illustrating a method for performing domain control validation in accordance with the present disclosure.

FIG. 2 is a flowchart illustrating a method for performing domain control validation in accordance with the present disclosure. The method illustrated in FIG. 2 may be executed in the environment depicted in FIG. 1, though it will be appreciated that other environments may instead be utilized.

In step 202 subscriber 106 logs into an administration account for a host account that is associated with a domain (e.g., example.com) and has a website hosted by web hosting provider 100. This login procedure requires that subscriber 106 provide authentication credentials (e.g., password, one-time use token, and the like) before subscriber 106 will be granted access to the administration account. Because subscriber 106 is required to provide acceptable credentials before access is granted, the act of the user logging-in to the administration interface in step 202 indicates that the subscriber is an authorized user having sufficient rights to modify settings associated with the account and, thereby, can request a signed certificate for the domain.

Accordingly, in step 204 subscriber 106, having logged into the administration account requests a signed security certificate for the domain associated with the administration account. This request may be initiated, for example by the subscriber initiating a request through the administration interface provided by web hosting provider 100. In step 206, a CSR is generated for the subscriber's domain. The content of the CSR may be collected from one or more user databases (such as customer information databases) maintained by the web hosting provider. Alternatively, subscriber 106 may be prompted to supply the information necessary to complete the CSR.

In step 208, web hosting provider 100 transmits the CSR generated in step 206 to certificate authority 102 for consideration. Along with the CSR, web hosting provider 108 also transmits the IP address of the subscriber's hosted account. Because web hosting provider 108 hosts the subscriber's domain, this IP address will point to one of the web servers of web hosting provider 108 that is currently hosting the website of the subscriber's domain. The IP address of the subscriber's hosted account, therefore, is determined by, and in the control of, web hosting provider 108. The subscriber cannot select or designate the IP address that will be utilized to host the subscriber's account.

After receiving both the CSR and IP address of the associated website, certificate authority 102 inspects the CSR to determine the domain name for which the security certificate is requested. Certificate authority 102 then accesses DNS system 104 to identify the IP address stored in the DNS system 104 for the domain. The IP address received from DNS system 104 is then compared to the IP address provided by web hosting provider 100 in step 210.

If the IP address received from DNS system 104 matches the IP address received from web hosting provider 100 in step 208, it is determined that the subscriber is authorized to request the signed security certificate. As such, in step 212 certificate authority 102 will sign the certificate contained within the CSR and return the signed certificate to web hosting provider 100. The signed certificate may then be installed into the subscriber's website and utilized to enable secure communications with the same.

If the IP address received from DNS system 104 does not match the IP address received from web hosting provider 100 in step 208, it is determined that the subscriber is not authorized to request the signed security certificate and the request is rejected. In the case that a request is rejected, a notification may be transmitted to the web hosting provider containing information explaining why the request was rejected.

In some cases, when the IP addresses do not match and the request is rejected, alternative methods of domain control validation (such as by issuing an email to an administrative contact identified in WHOIS records or prompting the requester to modify a DNS entry associated with the domain or modify web content hosted at the domain) may be utilized in an attempt to complete the signing request.

Figure 3:
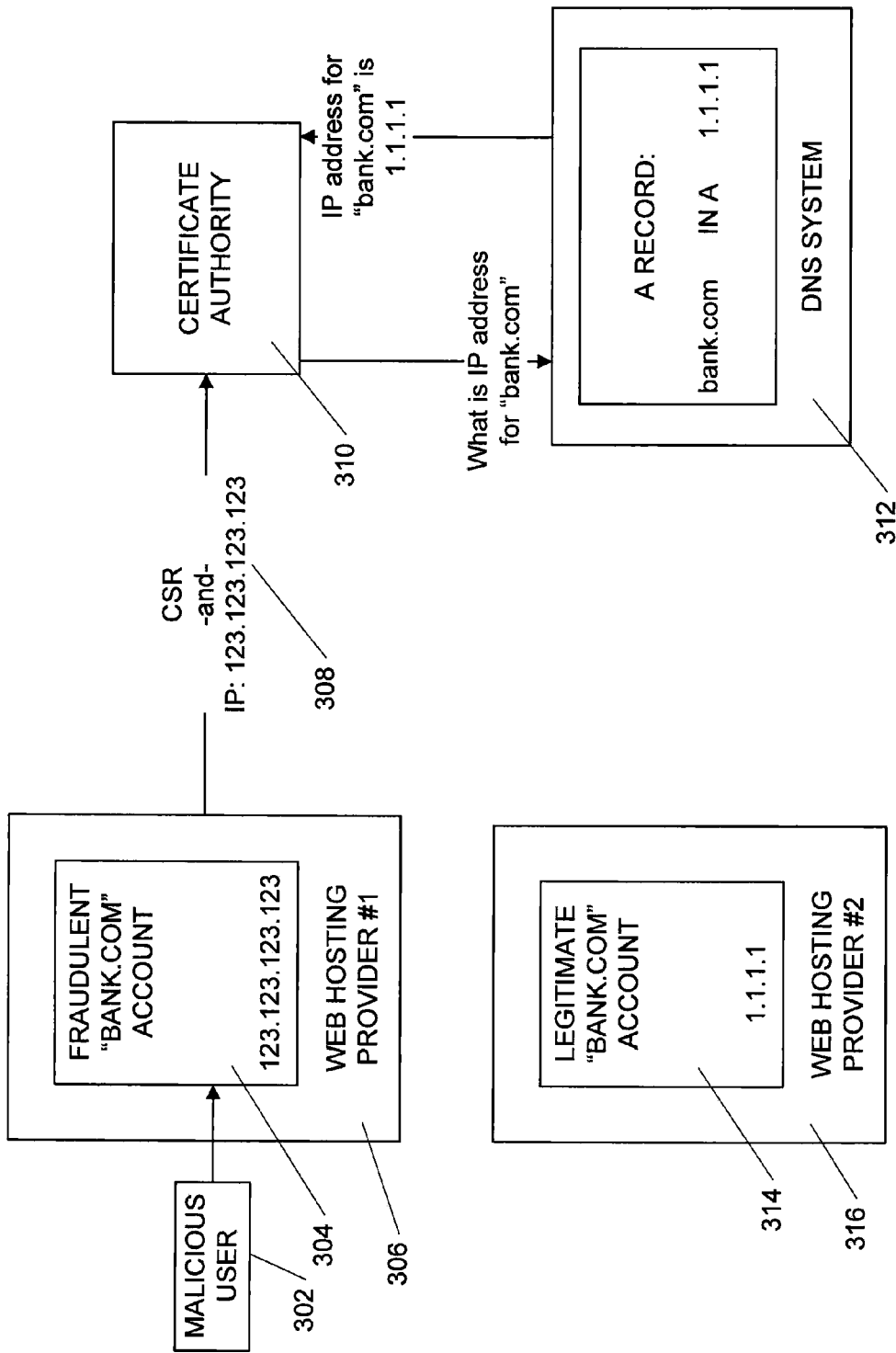
FIG. 3 depicts an example data flow through the environment of FIG. 1 demonstrating the present method for domain control validation.

In general, the method illustrated in FIG. 2 establishes two criteria that must be met before a security certificate can be signed by a certificate authority, namely 1) that the requester has sufficient authority to request a signed certificate for the target domain that is hosted on the web hosting provider, and 2) that the target domain identified in the CSR is actually hosted with the web hosting provider. The satisfaction of these two criteria prevents a malicious user from creating a fake account with a hosting provider that claims to be the hosting account for another entity's domain. FIG. 3 depicts an example data flow through the environment of FIG. 1 demonstrating the present method for domain control validation.

As shown in FIG. 3, a malicious user 302 may wish to acquire a signed security certificate for the domain "bank.com". In an attempt to acquire the certificate, the malicious user 302 creates an account 304 with a first web hosting provider 306. The account 304 created by malicious user 302 purports to be the hosted account for "bank.com". As shown in FIG. 3, the IP address of the hosted account is 123.123.123.123, which is an IP address that refers to one of the server utilized by web hosting provider 306 to host the account 304 and its content.

The correct bank.com account 314 is, in fact, hosted by a different hosting provider 316. The IP address of the correct bank.com account 314 is 1.1.1.1, which is also stored in the records of DNS system 312.

Once the malicious account 304 is created. The user 302 may then attempt to request, through web hosting provider 306, a signed certificate for the false account 304. For example, user 302 may log into an administrator account for account 304 via an administrative interface provided by web hosting provider 306. Using the administrative account, user 302 may be able to initiate a request for a signed certificate for the domain associated with account 304. If the signed certificate is ultimately issued, the user 302 will be in possession of a valid, signed certificate for the domain "bank.com". The present method prevents a malicious requester from acquiring such a fraudulent certificate.

In the present system and method, the first criterion is satisfied by the web hosting provider 306. For example, through the execution of step 202 of FIG. 2 (the requester logging into an administration account associated with the hosted domain), the web hosting provider 306 can determine that the user 302 is an administrator for the hosted account 304. In the present example, the malicious user 302 is an administrator for the account associated with the fraudulent "bank.com" domain (after all, the user 302 created the account). Accordingly, after logging into the hosting provider's 306 administrative account, the user 302 is able to request a signed certificate through web hosting provider 306.

The second criterion is then satisfied by the certificate authority (for example, in step 210 of the method of FIG. 2). Accordingly, if the certificate authority has a trusted relationship with the web hosting provider, the certificate authority can determine whether both criteria are satisfied without any additional input from the requester.

In the present example, after the signed certificate is requested by the malicious user, a CSR is transmitted to the certificate authority 310. As described in step 208 of FIG. 2, the CSR is transmitted along with the IP address of the malicious bank.com domain of the hosting provider (see arrow 308). Upon receiving the CSR, the certificate authority 310 issues a request to DNS system 312 to retrieve the IP address for the domain identified in the CSR (i.e., bank.com). DNS system 312 then responds with its stored IP address (in this case, 1.1.1.1). Certificate authority 310 can then compare the IP address of the fraudulent bank.com account (received along with the CSR) and compare that IP address to the IP address of the correct bank.com domain (retrieved from DNS system 312). Because the two IP addresses will not match, the request can be rejected.

In some cases, to provide load balancing websites may be hosted on a number of different servers or are otherwise addressable by a number of different IP address. For example, in a round-robin DNS configuration, DNS servers are configured to return one of a number of candidate IP addresses for a particular domain in response to a lookup request. By returning different IP addresses in response to lookup requests, the requests issued to the domain can be spread out amongst a number of different servers, lessening the load on one particular server.

With regards to the present disclosure, if it is the case that the domain for which a CSR is issued can be accessed through a number of different IP addresses, in step 208 of FIG. 2, all of those potential IP addresses are forwarded to the certificate authority. After determining that the incoming request received from the web hosting provider includes multiple IP addresses, the certificate authority is put on notice that a number of IP addresses may be associated with the domain in question.

Accordingly, in step 210 the certificate authority, having been put on notice that the domain in question may be referred to by a number of IP addresses, may retrieve a listing of all IP addresses associated with the domain from DNS system 104 (though in other implementations, only a single IP address may be retrieved from the DNS system and then compared to the listing provided by the web hosting provider). Then, if one of the IP addresses in the list received from web hosting provider 100 matches one of the IP addresses in the list received from DNS system 104, the certificate authority signs the certificate and returns the signed certificate to web hosting provider 100. If there is no match, it is determined that the subscriber is not authorized to request the signed security certificate and the request is rejected.

Figure 4:
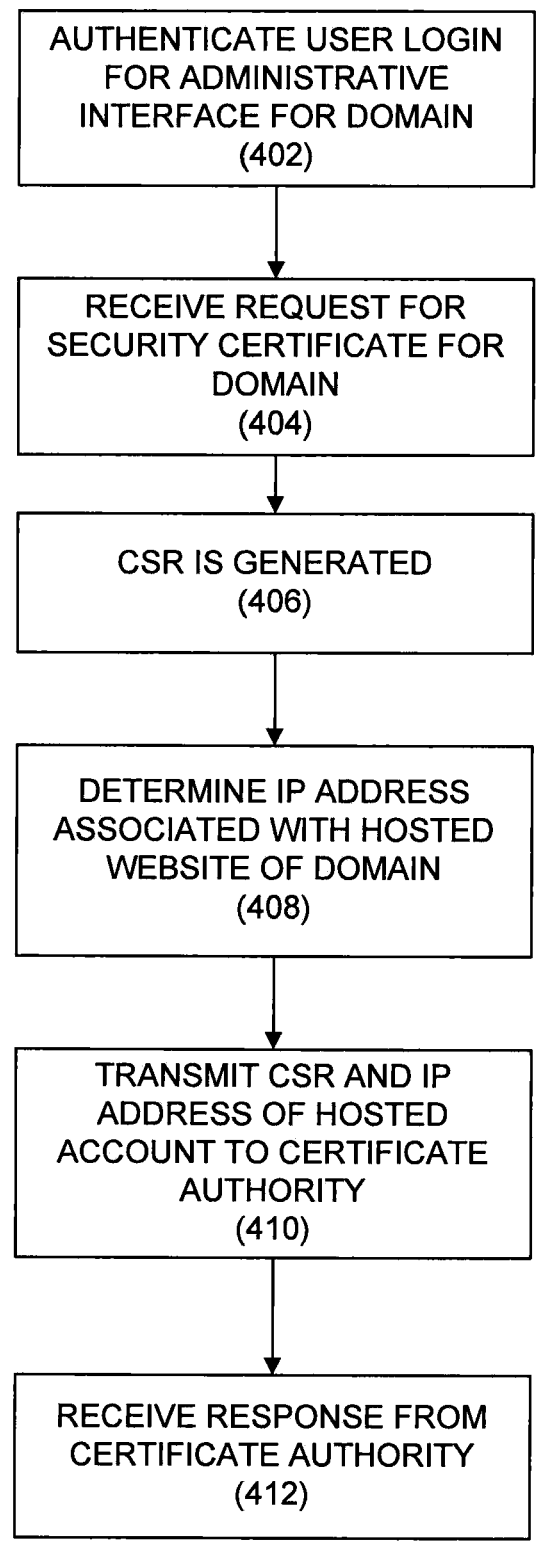
FIG. 4 is a flow chart illustrating a method for a web hosting provider to issue a CSR to a certificate authority in accordance with the present disclosure.

FIG. 4 is a flow chart illustrating a method for a web hosting provider to issue a CSR to a certificate authority in accordance with the present disclosure. In step 402 a user attempting to login to an administrative interface for a particular domain is authenticated. This may involve the web hosting provider collecting a username and password for a user and authenticating the user based upon the combination of username and password. In other implementations, different security tokens may be used.

If the user is authenticated, in step 404 a request is received from the user for a security certificate for a domain that is under the control of the authenticated user via the administrative interface. In step 406, after receiving the request a CSR is created for the domain.

In step 408, all IP addresses for the hosted account or website for the domain are identified. In this step, the web hosting provider hosting the user's account will generate a list of the IP addresses that identify servers upon which the user's website may reside. In some cases this will be a single IP address, but, as described above, in some server implementations the list may include multiple IP addresses.

In step 410 the CSR generated in step 406 and the list of IP addresses generated in step 408 are transmitted to a certificate authority. The certificate authority can use the information transmitted in this step to determine whether a security certificate should be issued in response to the request. Accordingly, in step 412 a response is received from the certificate authority. If the one of the IP addresses transmitted in step 410 matching an IP addresses stored for the domain in a DNS system, the response may include a signed certificate. If there is no match, the response may include an indication that the request was denied.

As a non-limiting example, the steps described above (and all methods described herein) may be performed by any central processing unit (CPU) or processor in any computer or computing system, such as a microprocessor running on a server computer, and executing instructions stored (perhaps as applications, scripts, apps, and/or other software) in computer-readable media accessible to the CPU or processor, such as a hard disk drive on a server computer, which may be communicatively coupled to a network (including the Internet). Such software may include server-side software, client-side software, browser-implemented software (e.g., a browser plugin), and other software configurations.

The present disclosure describes preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention has been described in terms of one or more preferred embodiments, and it should be appreciated that many equivalents, alternatives, variations, and modifications, aside from those expressly stated, are possible and within the scope of the invention.

The invention claimed is:

1. A system, comprising:
   at least one server computer having a processor and being configured to:
   receive a request including a certificate signing request and a first Internet protocol address, the certificate signing request identifying a domain and a certificate;
   retrieve a second Internet protocol address for the domain from a domain name system;
   when the first Internet protocol address is the same as the second Internet protocol address:
   sign the certificate, and
   transmit the signed certificate to a requester of the request; and
   when the first Internet protocol address is not the same as the second Internet protocol address, reject the certificate signing request.

2. The system of claim 1, wherein the request is received from a web hosting provider.

3. The system of claim 2, wherein rejecting the certificate signing request includes transmitting a notification to the web hosting provider.

4. The system of claim 2, wherein the at least one server computer is hosted by a certificate authority and the certificate authority and the web hosting provider have a pre-established trusted relationship.

5. The system of claim 4, wherein the certificate authority and the web hosting provider are the same entity.

6. The system of claim 4, wherein the certificate authority and the web hosting provider are different entities.

7. The system of claim 1, wherein the at least one server computer is configured to:
   determine whether the request includes a first plurality of Internet protocol addresses; and
   when the request includes the first plurality of Internet protocol addresses, retrieve a second plurality of Internet protocol addresses for the domain from a domain name system server.

8. The system of claim 7, wherein the first Internet protocol address is selected from the first plurality of Internet protocol addresses and the second Internet protocol address is selected from the second plurality of Internet protocol addresses.

9. The system of claim 1, wherein, when the first Internet protocol address is not the same as the second Internet protocol address, the at least one server computer is configured to initiate an alternative method for performing domain control validation for the domain.

10. A system, comprising:
    at least one server computer having a processor and being configured to:
    receive a request from a second server computer, the second server computer operating an administration account for a domain, the request including a certificate signing request and a first Internet protocol address of a third server computer hosting a website for the domain, the certificate signing request identifying the domain and a certificate;
    retrieve a second Internet protocol address for the domain from a domain name system;
    when the first Internet protocol address is the same as the second Internet protocol address:
    sign the certificate, and
    transmit the signed certificate to a requester of the request; and
    when the first Internet protocol address is not the same as the second Internet protocol address, reject the certificate signing request.

* * * * *